(12) United States Patent
Blakborn

(10) Patent No.: US 10,797,444 B2
(45) Date of Patent: Oct. 6, 2020

(54) HIGH-VOLTAGE INTERLOCK SYSTEM

(71) Applicant: Rosenberger Hochfrequenztechnik GmbH & Co. KG, Fridolfing (DE)

(72) Inventor: Willem Blakborn, Inzell (DE)

(73) Assignee: ROSENBERGER HOCHFREQUENZTECHNIK GMBH, Fridolfing (DE)

( * ) Notice: Subject to any disclaimer, the term of this patent is extended or adjusted under 35 U.S.C. 154(b) by 0 days.

(21) Appl. No.: 16/097,812

(22) PCT Filed: May 2, 2017

(86) PCT No.: PCT/EP2017/000546
§ 371 (c)(1),
(2) Date: Oct. 30, 2018

(87) PCT Pub. No.: WO2017/190833
PCT Pub. Date: Nov. 9, 2017

(65) Prior Publication Data
US 2019/0131744 A1    May 2, 2019

(30) Foreign Application Priority Data

May 4, 2016  (DE) .................. 10 2016 005 510

(51) Int. Cl.
*H01R 13/658* (2011.01)
*B60L 3/04* (2006.01)
(Continued)

(52) U.S. Cl.
CPC .......... *H01R 13/658* (2013.01); *B60L 3/0069* (2013.01); *B60L 3/04* (2013.01);
(Continued)

(58) Field of Classification Search
CPC .. H01R 13/641; H01R 13/53; H01R 13/7031; H01R 13/5202; H01R 13/14;
(Continued)

(56) References Cited

U.S. PATENT DOCUMENTS

| 4,845,593 A | 7/1989 | Brown et al. |
| 5,554,893 A | 9/1996 | Oku |

(Continued)

FOREIGN PATENT DOCUMENTS

| DE | 19710416 A1 | 8/1998 |
| DE | 102007010515 B3 | 9/2008 |

(Continued)

*Primary Examiner* — Briggitte R. Hammond
(74) *Attorney, Agent, or Firm* — David P. Dickerson

(57) ABSTRACT

The present invention relates to a HVIL system for a HV connector, in particular in a motor vehicle, which HV connector is configured to transmit HV current from the HV connector to a further component, wherein the HVIL system has a first HVIL contact element and a second HVIL contact element, wherein, in a non-plugged state of the HV connector, the first HVIL contact element is spaced apart from the second HVIL contact element by at least one first spring element; and wherein, in a plugged state of the HV connector, the first spring element is deformed in such a way that the first HVIL contact element makes contact with the second HVIL contact element in such a way that the HVIL system ensures that HV current is transmitted from the HV connector to the further component if the connection between the HV connector and the further component is secure. The present invention furthermore relates to a method for establishing a HV connection.

14 Claims, 5 Drawing Sheets

(51) Int. Cl.
    *H01R 13/53* (2006.01)
    *H01R 13/14* (2006.01)
    *H01R 13/703* (2006.01)
    *B60L 3/00* (2019.01)
    *H01R 13/641* (2006.01)
    *H01R 4/48* (2006.01)
    *H01R 13/52* (2006.01)

(52) U.S. Cl.
    CPC ............ *H01R 4/4809* (2013.01); *H01R 13/14* (2013.01); *H01R 13/5202* (2013.01); *H01R 13/53* (2013.01); *H01R 13/641* (2013.01); *H01R 13/7031* (2013.01); *H01R 2201/26* (2013.01)

(58) Field of Classification Search
    CPC ..... H01R 4/4809; H01R 2201/26; B60L 3/04; B60L 3/0069
    See application file for complete search history.

(56) References Cited

U.S. PATENT DOCUMENTS

| | | | |
|---|---|---|---|
| 7,641,499 B1 | 1/2010 | George | |
| 8,597,043 B2* | 12/2013 | Zhao | H01R 13/707 307/10.1 |
| 9,093,769 B2* | 7/2015 | Youn | H01R 13/53 |
| 9,166,329 B2* | 10/2015 | Eckel | H01R 13/5219 |
| 9,634,441 B2* | 4/2017 | Kim | H01R 13/707 |
| 2014/0273628 A1 | 9/2014 | De Chazal | |

FOREIGN PATENT DOCUMENTS

| | | |
|---|---|---|
| DE | 102011082897 A1 | 3/2013 |
| EP | 2621028 A1 | 7/2013 |

\* cited by examiner

HIGH-VOLTAGE INTERLOCK SYSTEM

FIELD OF THE INVENTION

The present invention relates to a HVIL system for a HV connector, in particular in a motor vehicle, which HV connector is configured to transmit HV current from the HV connector to a further component.

In the following text, "HV" stands for "high-voltage" and HVIL stands for "high-voltage interlock system".

TECHNICAL BACKGROUND

Hybrid, electric and fuel cell-operated vehicles generally use an electrical high-voltage system, which comprises at least one high-voltage energy source, such as, for example, a battery, a fuel cell, a generator or the like. Before a person (for example a technician) can come into physical contact with a current-carrying component of the electrical system (for example the locking connection terminals), the high-voltage energy source should be isolated and any locally stored electrical energy should be discharged. For this reason, the electrical high-voltage system can use a high-voltage interlock loop system (HVIL system, HVIL from high-voltage interlock loop), which initiates discharge (or isolation) of the energy source when an attempt to access the locking connection terminals is detected.

SUMMARY OF THE INVENTION

Against this background, the present invention is based on the object of specifying a HVIL system having kinematics.

This object is addressed by the embodiments recited in the independent claims. Further embodiments are recited in the dependent claims.

Accordingly, there is provision for:
a HVIL system for a HV connector, in particular in a motor vehicle, which HV connector is configured to transmit HV current from the HV connector to a further component, wherein the HVIL system has a first HVIL contact element and a second HVIL contact element, wherein, in a non-plugged state of the HV connector, the first HVIL contact element is spaced apart from the second HVIL contact element by at least one first spring element; and wherein, in a plugged state of the HV connector, the first spring element is deformed in such a way that the first HVIL contact element makes contact with the second HVIL contact element in such a way that the HVIL system ensures that HV current is transmitted from the HV connector to the further component if the connection between the HV connector and the further component is secure; and a method for establishing a HV connection with a locking mechanism; a first connector portion, which has at least one first power contact; and with a second connector portion, which has at least one second power contact, at least one first spring element, a first HVIL contact element and a second HVIL contact element; which method contains the following steps: contact-making of the first power contacts with the second power contacts; deformation of a first spring element by way of the contact-making of the first power contacts with the second power contacts; locking of the HV connection by means of the locking mechanism; establishment of contact between the first HVIL contact element and the second HVIL contact element after the deformation of a first spring element and after the locking of the HV connection; transmission of HV current between the first power contact and the second power contact while the first HVIL contact element is connected to the second HVIL contact element.

The idea on which the present invention is based consists in providing a HVIL system, which is formed as lagging with respect to the power contacts on account of kinematics. Lagging with respect to the power contacts means that, first of all, contact is established between the power contacts and the HVIL contact elements make contact after the contact-making of the power contacts.

Due to the lagging on account of the plug kinematics, a HVIL system that operates substantially independently of geometric error tolerances is provided.

It is understood that the constituent parts of the HVIL system are not in any way formed in a single connector portion of a HV connector. Instead, the constituent parts can be arranged in an application-specific manner in a first connector portion and a second connector portion of a HV connector. For example, it is possible to form the first spring element in a cable-side or in an assembly-side connector portion.

Advantageous refinements and developments result from the further dependent claims and from the description with reference to the figures of the drawing.

It is self-evident that the features mentioned above and the features yet to be discussed below may be used not only in the respectively specified combination but also in other combinations or individually without departing from the scope of the present invention.

According to a preferred embodiment of the invention, the second HVIL contact element is formed as a second spring element, in particular as a leaf spring. The first HVIL contact element therefore presses against the second HVIL contact element. This ensures robust contact and also guarantees compensation of manufacturing tolerances between the first and the second HVIL contact element.

According to a further preferred embodiment of the invention, the HV connector has a cable-side connector portion and an assembly-side connector portion, wherein the first HVIL contact element, the second HVIL contact element and the first spring element are arranged in the cable-side connector portion. Connection on the assembly-side is simplified in this way. In addition, the cable-side arrangement of the resilient elements is particularly user-friendly.

According to a further preferred embodiment of the invention, the HV connector has a cable-side connector portion and an assembly-side connector portion, wherein the HVIL system has a third HVIL contact element in the assembly-side connector portion, wherein the third HVIL contact element is configured to make contact with the first HVIL contact element and is connected to an identification device for examining the contact between the first HVIL contact element and the second HVIL contact element and between the first HVIL contact element and the third HVIL contact element. In this way, the cable side and the assembly side of the HV connector are connected by means of the HVIL system so that separation of the HV connection can also be detected in a particularly simple manner on the assembly side.

According to a further preferred embodiment of the invention, the third HVIL contact element is formed in a socket. Consequently, the first HVIL contact element is formed as a male HVIL contact element with respect to the socket. As a result of this, a particularly robust connection and reliable detection of the first and of the third HVIL contact element are ensured.

According to a further preferred embodiment of the invention, the first HVIL contact element is formed in a substantially L-shaped or pin-shaped manner. The L shape or pin shape guarantees that the first HVIL contact element forms both a male HVIL contact element and a planar HVIL contact element. In particular, it is expedient that the first HVIL contact element has a first male contact region and a second contact region for establishing areal contact.

According to a further preferred embodiment of the invention, the first and/or second HVIL contact element is formed so as to be horizontally offset with respect to the first spring element. In this way, the physical height of a HV connector can be reduced using a HVIL system according to the invention.

According to a further preferred embodiment of the invention, the first HVIL contact element and the second HVIL contact element is formed between two or four first spring elements. In this way, a HVIL system can monitor the power contacts in a two-pole or four-pole connector portion.

According to a further preferred embodiment of the invention, the first spring element has a leaf spring, a helical spring and/or an elastomer block.

According to a further preferred embodiment of the invention, the HV connector has a cable-side connector portion and an assembly-side connector portion, wherein the cable-side connector portion and/or the assembly-side connector portion has a holding mechanism, the holding force of which corresponds at least to the weight force of the cable-side connector portion. The holding mechanism therefore prevents a plugged, unlocked HV connection from coming apart. There is a risk of coming apart, in particular, when the cable-side connector portion is connected to the assembly-side connector portion from below.

Consequently, it is ensured that the HV connection also has to be separated manually after the release of a locking mechanism. This delays the separation of the HV connection by a few seconds. This delay guarantees that the power contacts are discharged after the separation of the HVIL contacts to the extent that there is no risk of injury for a user.

According to a further preferred embodiment of the invention, the holding mechanism has a seal and a shielding element. A snap-locking mechanism, which further increases the holding force of the holding mechanism, can optionally be provided.

The above refinements and developments can be combined, if practical, arbitrarily with one another. Further possible refinements, developments and implementations of the invention also encompass combinations—not explicitly mentioned—of features of the invention described above or below with regard to the exemplary embodiments. In particular, here the person skilled in the art will also add individual aspects as improvements or supplementations to the respective basic form of the present invention.

In the following text, the figures are described in an interrelated and all-encompassing manner.

BRIEF DESCRIPTION OF THE DRAWINGS

The present invention is explained in more detail below with reference to the exemplary embodiments specified in the schematic figures of the drawing, in which.

Figure 1:
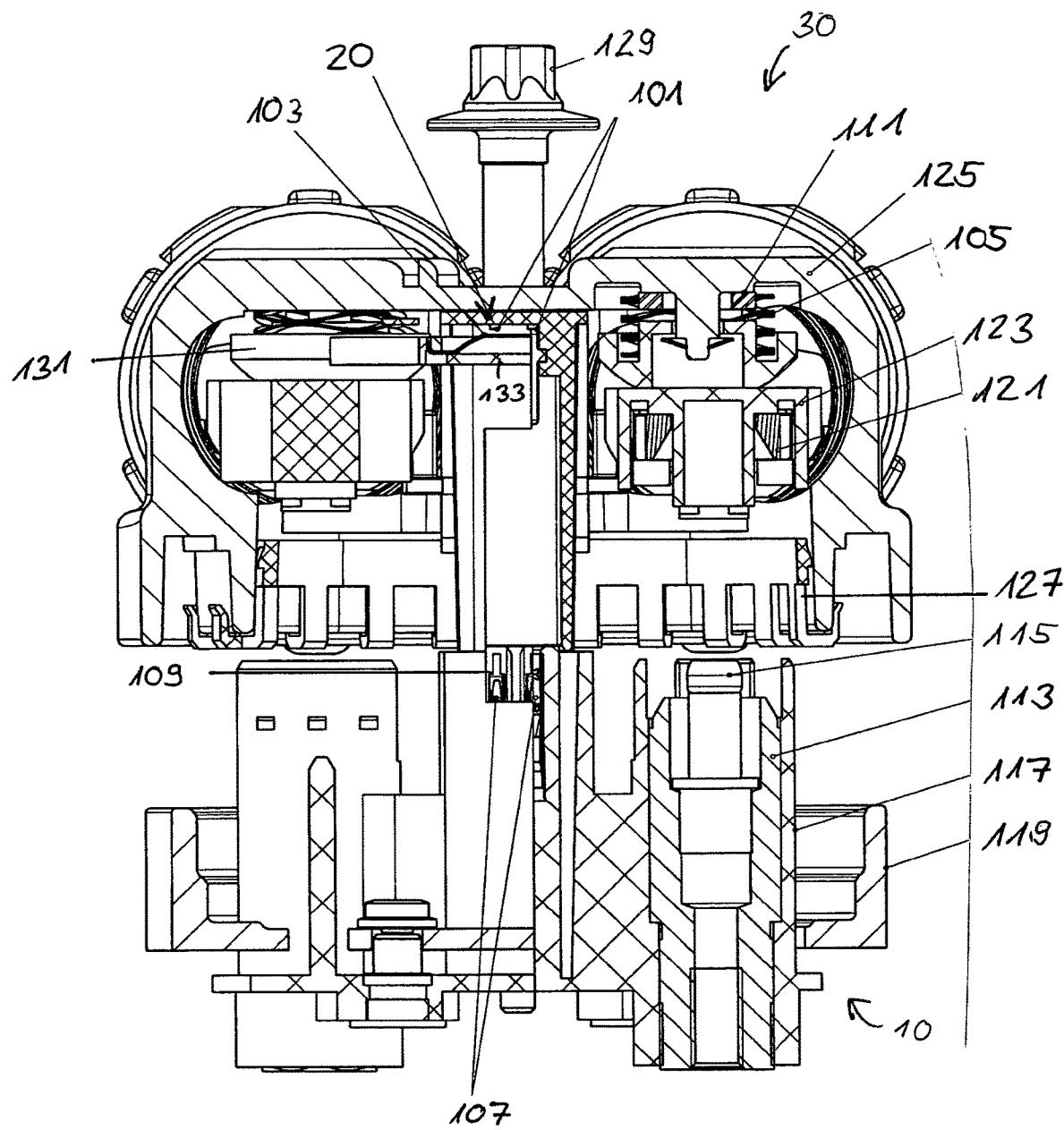
FIG. 1 shows a sectional view of an embodiment of a HVIL system according to the invention in a HV connector.

The accompanying figures of the drawing are intended to convey a further understanding of the embodiments of the invention. They illustrate embodiments and, in association with the description, serve to clarify principles and concepts of the invention. Other embodiments and many of the advantages mentioned are evident in view of the drawings. The elements of the drawings are not necessarily shown in a manner true to scale with respect to one another.

In the figures of the drawing, identical, functionally identical and identically acting elements, features and components—unless explicitly stated otherwise—are provided in each case with the same reference signs.

DESCRIPTION OF EXEMPLARY EMBODIMENTS

Although the present invention has been described completely above on the basis of preferred exemplary embodiments, it is not restricted thereto, but rather can be modified in diverse ways.

FIGS. 1-4 each show an embodiment of a connector according to the invention according to different method steps of the plugging process.

Figure 4:
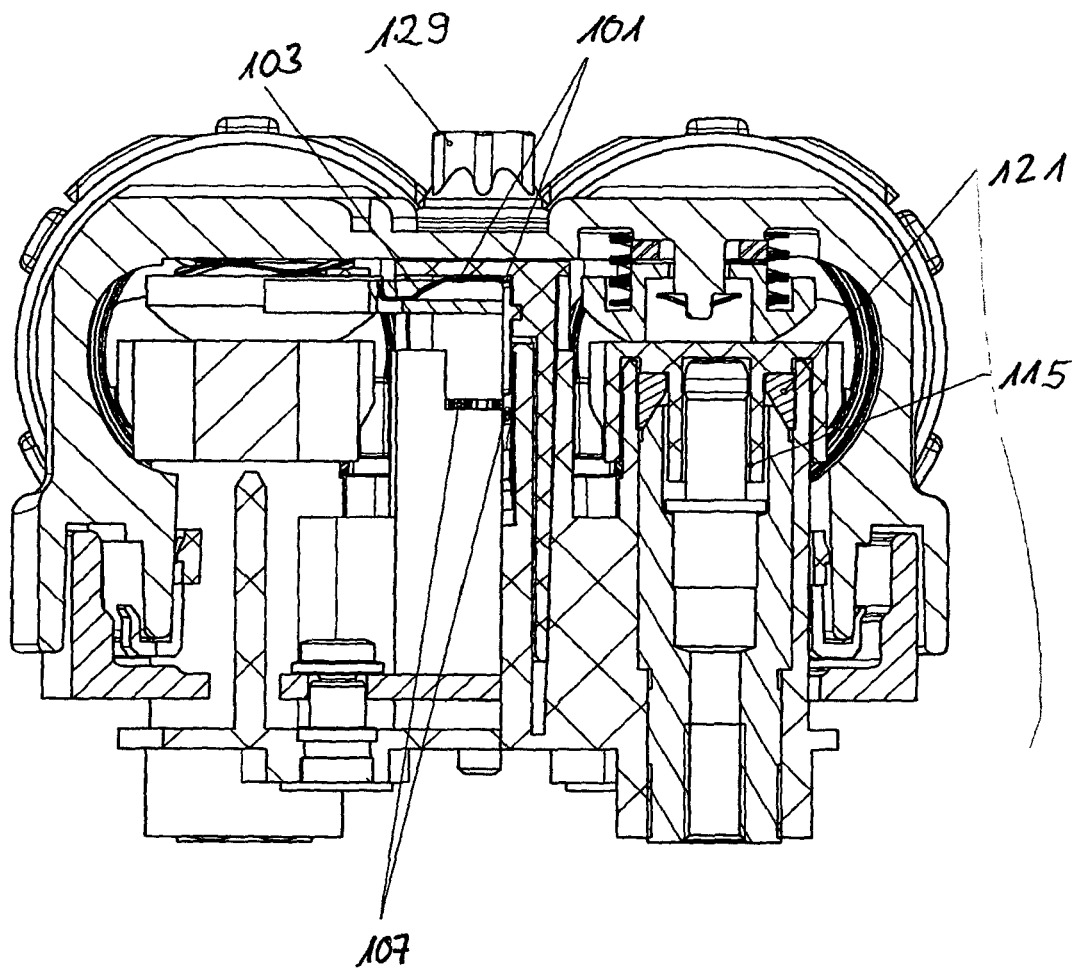
FIG. 4 shows a sectional view of an embodiment of a HVIL system according to the invention in a HV connector.
Figure 5:
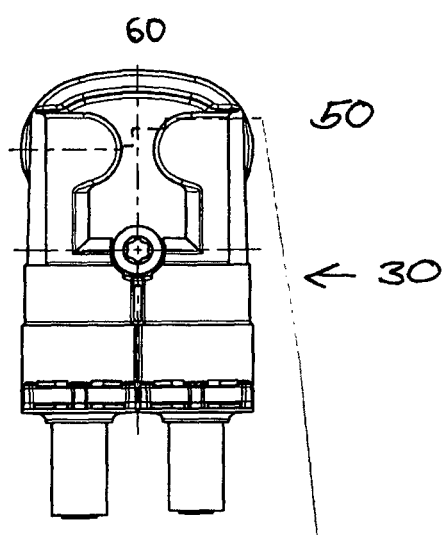
FIG. 5 shows a plan view of a HV connector portion in accordance with one of FIGS. 1-4.

FIG. 5 shows a plan view of a cable-side connector portion 30 according to the invention. FIG. 5 likewise illustrates the profile of the section line in FIGS. 1-4 through the section line 50.

FIG. 1 shows an assembly-side connector portion 10 and a cable-side connector portion 30 before the plugging process. The assembly-side connector portion 10 is usually fitted to a stationary system. The cable-side connector portion 30 is movable according to the cable length and cable flexibility.

The HV connector in accordance with FIGS. 1-4 has a HVIL system 20. In the present embodiment, a large part of the functionality of the HVIL system is formed in the cable-side connector portion. However, it is conceivable to reflect the functionalities from the cable-side connector portion 30 to the assembly-side connector portion 10 and vice versa and/or to distribute functionalities differently between the cable-side connector portion 30 and the assembly-side connector portion 10.

The illustrated HV connector is a two-pole connector. The two-pole connector is formed in a symmetrical manner with respect to the axis of symmetry 60. However, the symmetry is not illustrated in the figures on account of the particular section line.

For the purposes of simplification, reference is made in the following text only to one contact arrangement even though a two-pole connector is illustrated.

Both the cable-side connector portion 30 and the assembly-side connector portion 10 have power contacts 121 and 113. The power contacts 121 and 113 are each formed between an inner shock protection system and an outer shock protection system. In the assembly-side connector portion 10, the inner shock protection system 115 is formed as a shock protection pin and the outer shock protection system 117 is formed as an isolating wall 117. In the cable-side connector portion 30, the shock protection system 123 is formed as a single-part isolating part, which at the same time forms the inner and the outer shock protection system. The shock protection system is designed geometrically in such a way that a test finger cannot come into contact with the power contacts 113 and 121.

The cable-side connector portion 10 has at each pole a first spring element 105, which is formed as a helical spring. The spring 105 is inserted into an annular recess of the flange 131 and is connected indirectly to the isolating part 123 via said flange. The two flanges 131 of the two poles are connected to one another by means of a web 133. The first HVIL contact element 101, which in this embodiment has two L-shaped contacts, is formed opposite the web 133. The second HVIL contact element 103 is formed on the web 133. In the embodiments illustrated, the second HVIL contact element 103 is formed as a leaf spring.

The assembly-side connector portion 10 also has a third HVIL contact element 107. The third HVIL contact element 107 has two contacts, which are arranged in a socket.

In order to close the HVIL bridge, that is to say the HVIL system releases the current connection between the power contact elements 113 and 121, it is necessary for both the first HVIL contact element 101 to make contact with the second HVIL contact element 103 and for the first HVIL contact element 101 to make contact with the third HVIL contact element 107.

FIG. 1 shows the connector portions 10 and 30 before the plugging process. In the state illustrated, the HVIL contact elements 101, 103 and 107 do not make contact. Consequently, the HVIL bridge is open. In addition, the power contacts 113 and 121 do not make contact. The fastening screw 129 is located in a released position.

Figure 2:
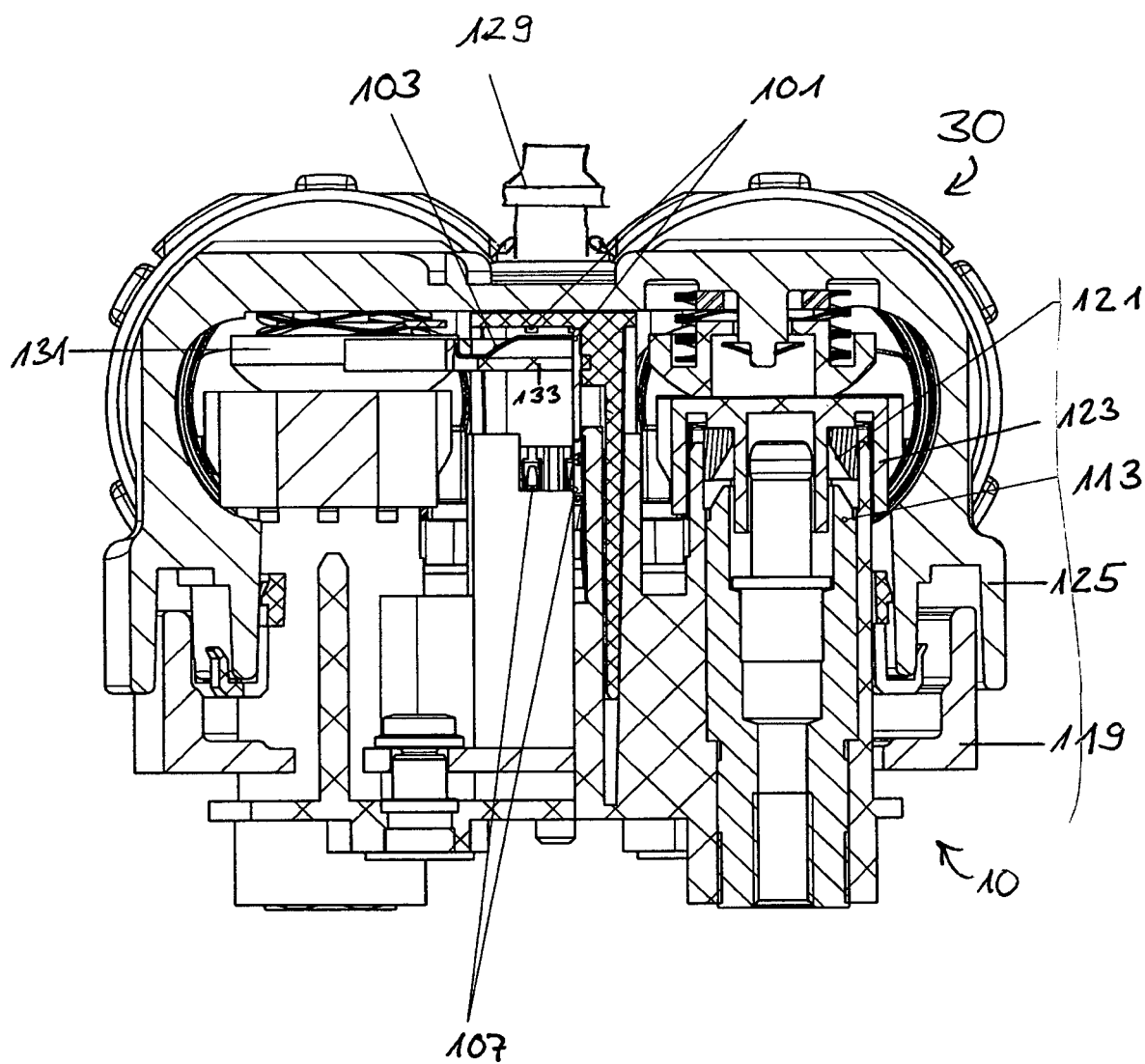
FIG. 2 shows a sectional view of an embodiment of a HVIL system according to the invention in a HV connector.

FIG. 2 shows the HV connector in accordance with FIG. 1 immediately before contact is established between the power contacts 121 and 113. The fact that the housings 119 and 125 of the connector portions 30 and 10 have already found one another is illustrated accordingly. Nevertheless, a connection for the purposes of power transmission is not yet established by virtue of the HVIL contact elements 101, 103 and 107 and the power contacts 121 and 113 not touching one another. Although the fastening screw 129 is already screwed into a bore, the fastening screw 129 is not located in its final position.

Figure 3:
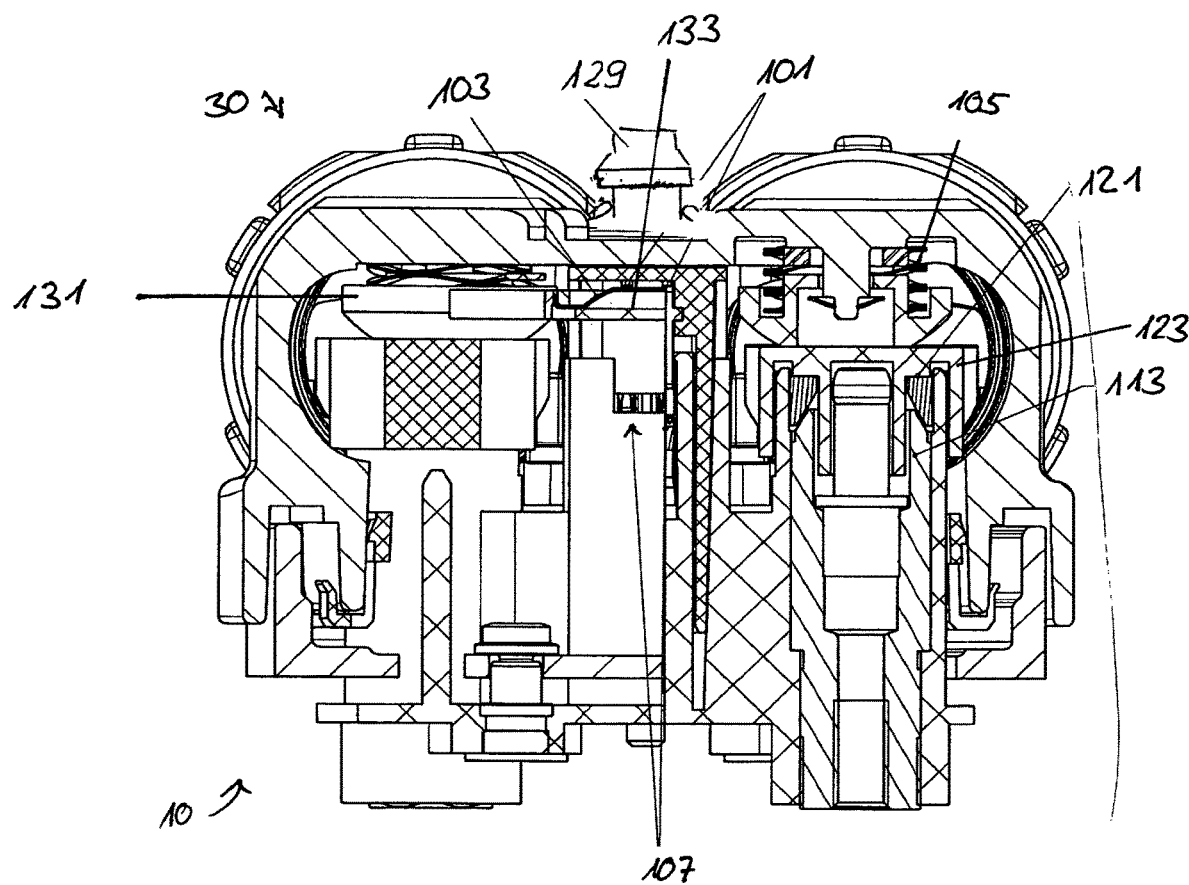
FIG. 3 shows a sectional view of an embodiment of a HVIL system according to the invention in a HV connector.

In FIG. 3, the fastening screw 129 is screwed almost completely into a bore in the connector portions 10 and 30. On account thereof, the power contacts 121 and 113 make contact with one another. A current connection between the power contacts 121 and 113 is not established yet, however.

As a result of the fact that the fastening screw 129 is already screwed almost completely into the connector portion 10 and into the connector portion 30, the spring 105 is compressed so that the spring 105 exerts a compression force via the flange 131 in the direction of the assembly-side connector portion 10 and the power contacts 121 and 113 are pressed against one another. Due to the compression of the spring 105, the flange 131 also lifts up.

On account of the compression of the spring 105 and the displacement of the web 133, in FIG. 3, the first HVIL contact element 101 and the second HVIL contact element 103 make contact with one another. However, the HVIL bridge is still not closed yet since the first HVIL contact element 101 does not make contact with the third HVIL contact element 107, with the result that current cannot be transmitted via the power contacts 113 and 121.

FIG. 4 shows the HV connector in a fully plugged, locked state by virtue of the fastening screw 129 being located in its final position. Accordingly, the power contacts 121 and 113, the HVIL contact elements 101 and 103, and the HVIL contact elements 101 and 107 touch one another. Consequently, the HVIL bridge is closed and HV current can be transmitted between the power contacts 121 and 113.

It is clear that the sequence of contact-making of the HVIL contact elements is also dependent on a user. The first HVIL contact element 101 thus makes contact with the second HVIL contact element first if the user applies so much manual force during plugging that the spring 105 is compressed. In contrast therewith, the first HVIL contact element 101 and the third HVIL contact element 107 will make contact with one another only after the screw 129 is located in its final position.

On the other hand, a user can have the connector portions 101 and 103 make contact even with a low manual force so that the spring 105 is not compressed and the connector portions 101 and 103 merely bear against one another. In this case, both the contact between the first HVIL contact element 101 and the third HVIL contact element 103 and the contact between the first HVIL contact element 101 and the third HVIL contact element 107 is established as soon as the screw 129 is located in its final position.

The HV connection is released accordingly. In this case, the fastening screw 129 is released first, whereupon the spring 105 expands. Consequently, the web 133, on which the second contact element 103 is mounted, is removed from the first HVIL contact element 101, so that the HVIL contact elements 101 and 103 no longer make contact with one another and the HVIL bridge is open, as soon as the screw 129 is no longer located in its final position.

After the fastening screw 129 has been fully screwed out of the bore of the assembly-side connector portion 10, the HV connection is held together by a holding mechanism, which prevents the assembly-side connector portion 10 and the cable-side connector portion 30 from coming apart unintentionally. The connector portion 30 can therefore be withdrawn from the assembly-side connector portion 10 by hand. In this case, so much time elapses between the unscrewing of the fastening screw 129 and the manual withdrawal of the connector portion 30 that the power contacts 121 and 113 are fully discharged.

LIST OF REFERENCE SIGNS

10 Assembly-side connector portion
20 HVIL system
30 HV connector
50 Section line
60 Axis of symmetry
101 First HVIL contact element
103 Second HVIL contact element
105 First spring element
107 Third HVIL contact element
109 Socket
111 Elastomer block
113 First power contact
115 Inner shock protection system
117 Outer shock protection system
119 Housing
121 Second power contact
123 Shock protection system
125 Housing
127 Shielding element
129 Screw
131 Flange
133 Web

The invention claimed is:

1. A connector assembly, comprising:
a first connector comprising a first contact element;
a second connector comprising a second contact element, said second connector engageable with said first connector such that said first contact element contacts said second contact element;
an interlock comprising a first interlock contact element, a second interlock contact element and a third interlock contact element; and
a first spring, wherein
in a non-engaged state of said first connector and said second connector, said first spring inhibits said first interlock contact element from contacting said second interlock contact element,
said first spring is deformable such that, in an engaged state of said first connector and said second connector, said first interlock contact element contacts said second interlock contact element,
in a non-fully-engaged state of said first connector and said second connector, said interlock prevents a flow of current to said first contact element,
at least one of said first interlock contact element, said second interlock contact element and said third interlock contact element is affixed to said first connector, and
at least one other of said first interlock contact element, said second interlock contact element and said third interlock contact element is affixed to said second connector.

2. The connector assembly of claim 1, wherein:
said first spring is situated in an interior of said first connector.

3. The connector assembly of claim 1, wherein:
said interlock is situated in an interior of said connector assembly.

4. The connector assembly of claim 1, wherein:
said second interlock contact element comprises a second spring.

5. The connector assembly of claim 1, wherein:
said first connector is a cable-side connector,
said second connector is an apparatus-side connector, and
said first spring, said first interlock contact element and said second interlock contact element are situated in said first connector.

6. The connector assembly of claim 5, wherein:
said third interlock contact element is situated in said second connector, wherein
in a non-engaged state of said first connector and said second connector, said third interlock contact element is not in contact with said first interlock contact element, and
in a fully-engaged state of said first connector and said second connector, said third interlock contact element is in contact with said first interlock contact element.

7. The connector assembly of claim 6, wherein:
said third interlock contact element is formed in a socket.

8. The connector assembly of claim 1, wherein:
said first interlock contact element and said second interlock contact element are offset from said first spring in a direction perpendicular to an insertion direction of said connector assembly.

9. The connector assembly of claim 1, comprising:
a retention mechanism that, in an unfastened state of said first connector and said second connector, inhibits an unintentional disengagement of said first connector and said second connector.

10. The connector assembly of claim 9, wherein:
said retention mechanism comprises a shielding element.

11. A method of establishing an electrical connection, comprising:
assembling a first connector comprising a first contact element to a second connector comprising a second contact element such that said first contact element contacts said second contact element and a spring is deformed,
fastening said first connector to said second connector,
establishing contact between a first interlock contact element of an interlock and a second interlock contact element of said interlock in response to said deforming of said spring and said fastening,
establishing contact between said first interlock contact element and a third interlock contact element of said interlock in response to said deforming of said spring and said fastening, and
selectively conducting current from said first contact element to said second contact element dependent on whether said first interlock contact element contacts said second interlock contact element and dependent on whether said first interlock contact element contacts said third interlock contact element, wherein
in a non-engaged state of said first connector and said second connector, said spring inhibits said first interlock contact element from contacting said second interlock contact element,
at least one of said first interlock contact element, said second interlock contact element and said third interlock contact element is affixed to said first connector, and
at least one other of said first interlock contact element, said second interlock contact element and said third interlock contact element is affixed to said second connector.

12. The method of claim 11, wherein:
said spring is situated in an interior of said first connector.

13. A connector assembly, comprising:
a first connector comprising a first contact element;
a second connector comprising a second contact element, said second connector engageable with said first connector such that said first contact element contacts said second contact element;
an interlock comprising a first interlock contact element and a second interlock contact element; and
a first spring, wherein
in a non-engaged state of said first connector and said second connector, said first spring inhibits said first interlock contact element from contacting said second interlock contact element,
said first spring is deformable such that, in an engaged state of said first connector and said second connector, said first interlock contact element contacts said second interlock contact element,
in a non-fully-engaged state of said first connector and said second connector, said interlock prevents a flow of current to said first contact element, and
said first spring is situated in an interior of said first connector, said interior being open to an ambient environment in said non-engaged state and substantially closed to said ambient environment by said second connector in said engaged state.

14. A method of establishing an electrical connection, comprising:
assembling a first connector comprising a first contact element to a second connector comprising a second contact element such that said first contact element contacts said second contact element and a spring is deformed, fastening said first connector to said second connector, establishing contact between a first interlock contact element of an interlock and a second interlock contact element of said interlock in response to said deforming of said spring and said fastening, and selectively conducting current from said first contact element to said second contact element dependent on whether said first interlock contact element contacts said second interlock contact element, wherein in a non-engaged state of said first connector and said second connector, said spring inhibits said first interlock contact element from contacting said second interlock contact element, and said spring is situated in an interior of said first connector, said interior being open to an ambient environment in said non-engaged state and substantially closed to said ambient environment by said second connector in a fully engaged state of said first connector and said second connector.

\* \* \* \* \*